United States Patent [19]
Wei

[11] Patent Number: 5,739,891
[45] Date of Patent: Apr. 14, 1998

[54] TEMPLE MOUNTING STRUCTURE OF AN EYEGLASSES

[76] Inventor: Mo Sui Wei, P.O. Box 82-144, Taipei, Taiwan

[21] Appl. No.: 802,531

[22] Filed: Feb. 18, 1997

[51] Int. Cl.$^6$ .................. G02C 5/16; G02C 5/00; G02C 5/22
[52] U.S. Cl. .................. 351/113; 351/140; 351/153; 16/228
[58] Field of Search .................. 351/113, 111, 351/140, 141, 115, 153, 41; 16/228

[56] References Cited

U.S. PATENT DOCUMENTS 5,406,339  4/1995  Chen .................. 351/113

Primary Examiner—Hung X. Dang
Attorney, Agent, or Firm—A & J

[57] ABSTRACT

A temple mounting structure including a rim lug raised from one rim of an eyeglass frame having a vertical axle hole and a transverse guide slot in communication with the vertical axle hole, a circular swivel block turned in the vertical axle hole of the rim lug, a socket holding a compression spring, a temple having a shoulder stopped outside the socket and a coupling rod inserted through the socket and the compression spring into the transverse guide slot of the rim lug and fixed to the circular swivel block, and a stepped, tubular stop member mounted around the coupling rod of the temple and stopped between the rim lug and the compression spring and forced by the spring force of the compression spring to hold the temple between the operative position and the collapsed position.

2 Claims, 4 Drawing Sheets

TEMPLE MOUNTING STRUCTURE OF AN EYEGLASSES

BACKGROUND OF THE INVENTION

1. Field of the Invention

This invention relates to eyeglasses, and more particularly to a temple mounting structure for connecting a temple to a rim lug at one rim of an eyeglasses which permits the temple to be firmly retained between the operative position and the collapsed position.

2. Description of the Prior Art

An eyeglasses is generally comprised of a frame having two rims holding a respective lens, and two temples respectively connected to the rims by a respective hinge. When the temples of an eyeglasses are folded up, they cannot be firmly retained in the collapsed position. If a collapsed eyeglasses is hung on the pocket, it may slip out of the pocket and fall to the floor when the user bends the body. FIG. 1 shows a temple mounting structure according to the prior art, which is designed with the purpose of eliminating the aforesaid problem. This temple mounting structure comprises a projecting frame bar B raised from the periphery of one rim A of an eyeglass frame, a lug C welded to a welding point P at the projecting frame bar B and having two vertical stop walls D connected at one end at right angles remote from the projecting frame bar B, an axle F fastened to the lug C by a screw E, a temple G, a coupling member H welded to welding points P at one end of the temple G, the coupling member H having an axle hole J, which receives the axle F, a partition wall M inside the axle hole J near one end, an inside annular flange K raised from the periphery of the axle hole J, and a stop wall I at one end abutted against one vertical stop wall D of the lug C, a ring L slidably mounted around the axle F and spaced between the partition wall M and the ring L, and a compression spring N mounted around the axle F and stopped between the ring L and the partition wall M. This temple mounting structure is functional, however it has numerous drawbacks as outlined hereinafter.

1. The manufacturing of the parts is complicated and expensive.

2. A special welding apparatus is needed to weld the lug C and the coupling member H to the projecting frame bar B and the temple G.

3. The assembly process consumes much labor, therefore the production speed of the eyeglasses is low.

4. The whole structure is heavy, and does not cause a sense of beauty.

SUMMARY OF THE INVENTION

This invention relates to eyeglasses, and more particularly to a temple mounting structure for connecting a temple to a rim lug at one rim of an eyeglasses which permits the temple to be firmly retained between the operative position and the collapsed position.

According to the preferred embodiment of the present invention, the temple mounting structure comprises a rim lug raised from one rim of an eyeglass frame having a vertical axle hole and a transverse guide slot in communication with the vertical axle hole, a circular swivel block turned in the vertical axle hole of the rim lug, a socket holding a compression spring, a temple having a shoulder stopped outside the socket and a coupling rod inserted through the socket and the compression spring into the transverse guide slot of the rim lug and fixed to the circular swivel block, and a stepped, tubular stop member mounted around the coupling rod of the temple and stopped between the rim lug and the compression spring and forced by the spring force of the compression spring to hold the temple between the operative position and the collapsed position. Because the rim lug is integrally made with the rim and the temple is inserted through the socket, the compression spring and the stop member and then fixed to the circular swivel block by a locating pin, the assembly process is simple without the use of any welding apparatus. When assembly, the whole structure causes a sense of beauty.

DETAILED DESCRIPTION OF THE PREFERRED EMBODIMENT

Figure 1:
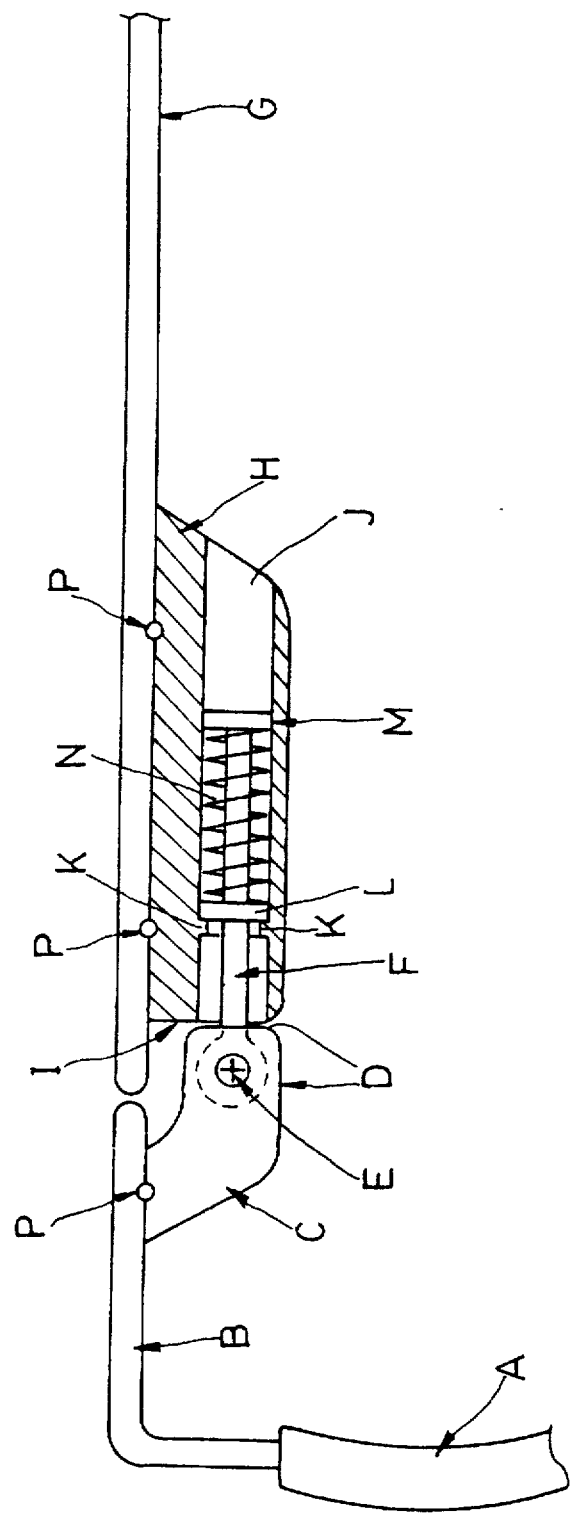
FIG. 1 is a sectional view showing a temple hinged to a rim according to the prior art.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
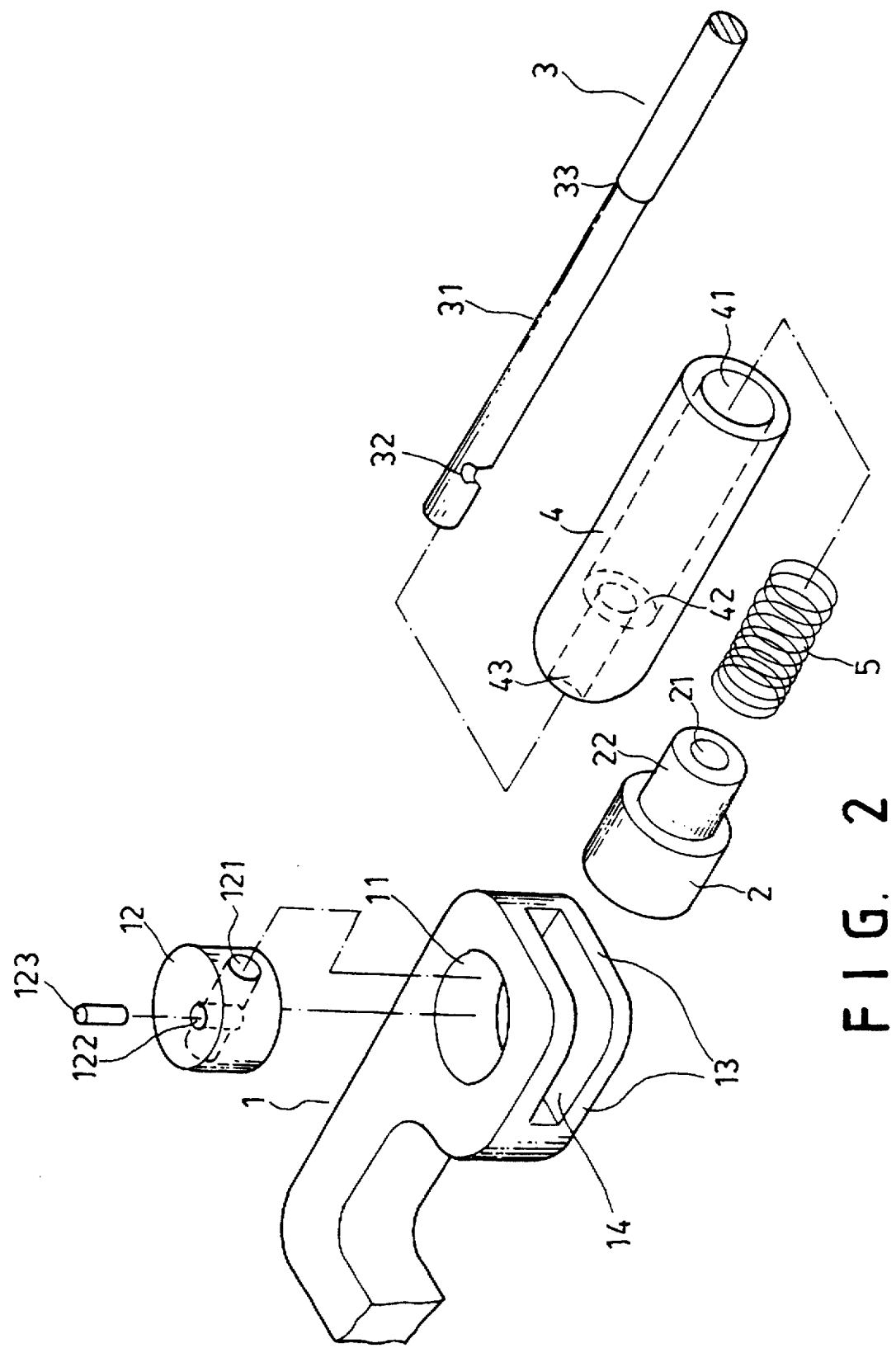
FIG. 2 is an exploded view of a temple mounting structure according to the present invention.

Referring to FIG. 2, a temple mounting structure in accordance with the present invention is generally comprised of a rim lug which is integrally raised from the periphery of a rim of an eyeglass frame, a circular swivel block 12, a stop member 2, a temple 3, a socket 4, and a spring 5.

The rim lug 1 comprises two vertical stop walls 13 connected at right angles at one end, a vertical axle hole 11 disposed adjacent to the and equally spaced from the vertical stop walls 13, and a transverse guide slot 14 extended through the vertical stop walls 13 and disposed in communication with the axle hole 11. The circular swivel block 12 has a transverse axle hole 121, and a vertical pin hole 122 perpendicularly extended from the transverse axle hole 121 to one side thereof. The outer diameter of the circular swivel block 12 is approximately equal to the diameter of the vertical axle hole 11 of the rim lug 1, however the vertical thickness of the circular swivel block 12 is longer than the height of the guide slot 14. Therefore, the circular swivel block 12 can be inserted into the vertical axle hole 11 and a part of the transverse guide slot 14, and prohibited from escaping out of the transverse guide slot 14 after its insertion into the vertical axle hole 11. The stop member 2 is a stepped stub tube comprising a front extension section 22, and an axial center through hole 21 through the axial center of the front extension section 22. The socket 4 comprises a cylindrical open chamber 41 and a longitudinal axle hole 43 longitudinally connected in a line, and a shoulder 42 disposed on the inside between the cylindrical open chamber 41 and the longitudinal axle hole 43. The diameter of the cylindrical open chamber 41 is approximately equal to the outer diameter of the front extension section 22 of the stop member 2 so that the front extension section 22 of the stop member 2 can be slidably inserted into the cylindrical open chamber 41 of the socket 4. The temple 3 comprises a coupling rod 31 at one end. The coupling rod 31 has a smoothly curved side notch 32 near the end. Furthermore, a shoulder 33 is formed between the temple 3 and the coupling rod 31. The spring 5 is a compression spring 5 adapted for mounting around the coupling rod 31 of the temple 3 within the longitudinal open chamber 41 of the socket 4.

Figure 3:
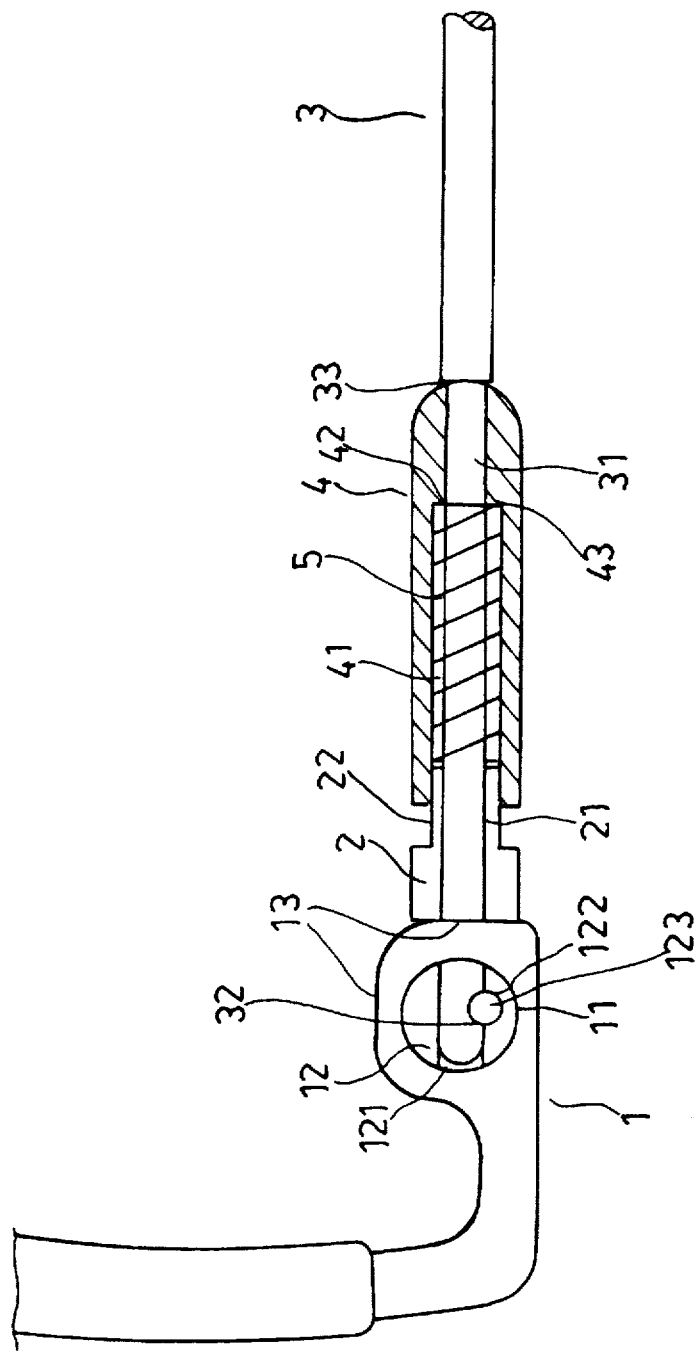
FIG. 3 is a sectional assembly view of the temple mounting structure shown in FIG. 2.

The assembly process of the present invention is outlined hereinafter with reference to FIGS. 1 and 3. The circular swivel block 12 is mounted in the vertical axle hole 11 of the rim lug 1, and the spring 5 is mounted within the longitudinal open chamber 41 of the socket 4 and stopped at the shoulder 42 of the socket 4, then the front extension section 22 of the stop member 2 is inserted into the longitudinal open chamber 41 of the socket 4 and stopped against the spring 5, and then the coupling rod 31 of the temple 3 is inserted in proper order through the longitudinal axle hole 43 of the socket 4, the spring 5, the axial center through hole 21 of the stop member 2 and the transverse guide slot 14 of the rim lug 1 and then into the transverse axle hole 121 of the circular swivel block 12, and then a locating pin 123 is inserted into the vertical pin hole 122 into engagement with the smoothly curved side notch 32 of the coupling rod 31 of the temple 3 to secure the temple 3 to the circular swivel block 12, permitting the stop member to be stopped at one vertical stop wall 13 of the rim lug 1 and the spring 5 and, the shoulder 33 of the temple 3 to be stopped at one end of the longitudinal axle hole 43 outside the socket 4.

Figure 4:
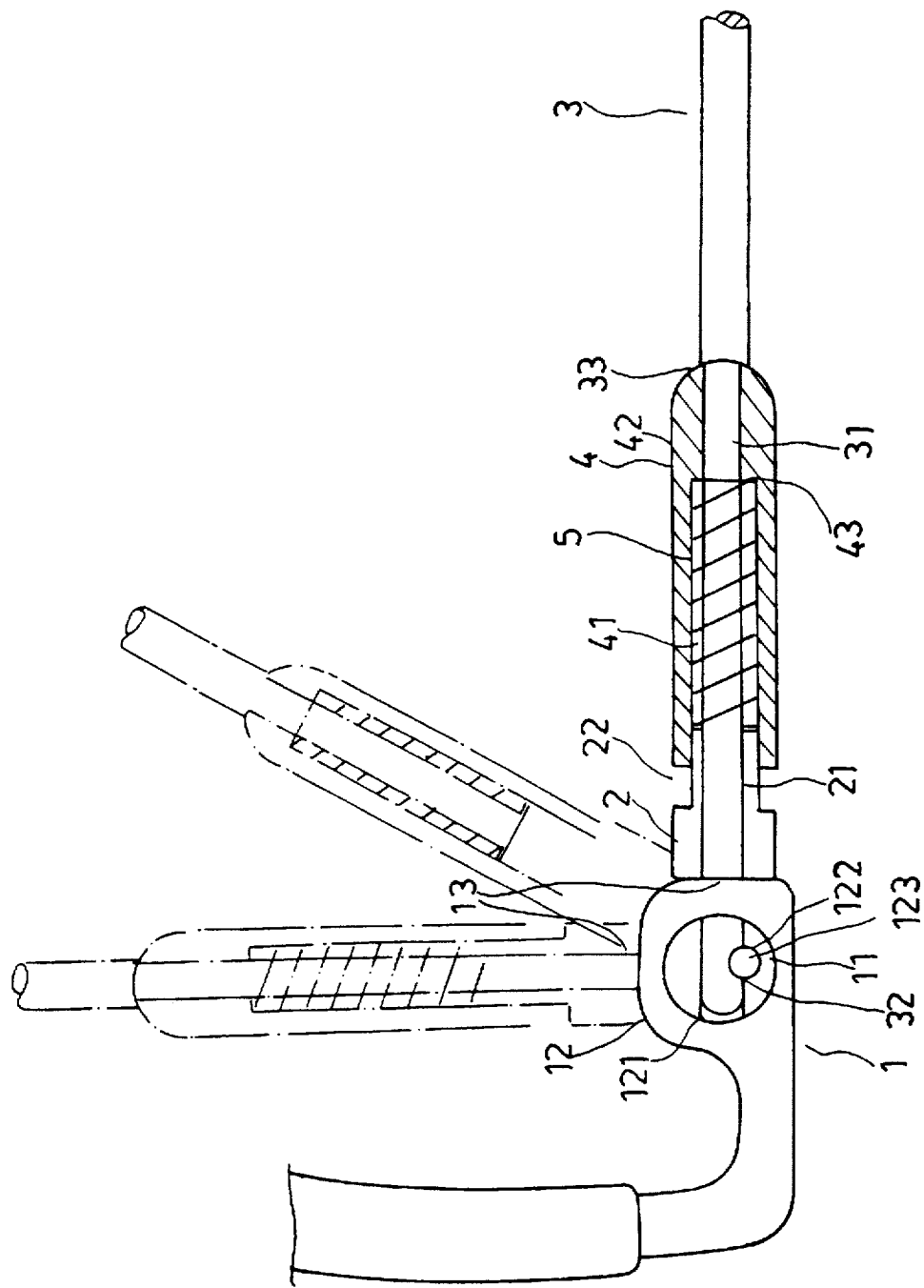
FIG. 4 is a schematic drawing showing the temple turned relative to the rim lug.

Referring to FIG. 4, when the stop member 2 is pulled outwards from the rim lug 1 to compress the spring 5, the temple 3 can then be turned relative to the rim lug 1 between the operative position (in which the stop member 2 is stopped at one vertical stop wall of the rim lug 1) and the collapsed position (in which the stop member 2 is stopped at the other vertical stop wall of the rim lug 1). When the temple 3 is turned to the collapsed position and released, the spring 5 immediately returns to its former shape, thereby causing the stop member 2 to be firmly stopped against the other vertical stop wall of the rim lug 1.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A temple mounting structure comprising:

a rim lug extended from the periphery of a rim of an eyeglass frame, said rim lug comprising a first vertical stop wall and a second vertical stop wall connected at right angles at one end, a vertical axle hole disposed adjacent to the and equally spaced from said first vertical stop wall and said second vertical stop wall, and a transverse guide slot extended through said first vertical stop wall and said second vertical stop wall and disposed in communication with said vertical axle hole;

a circular swivel block turned in the vertical axle hole of said rim lug, said circular swivel block comprising a transverse axle hole disposed in communication with the guide slot of said rim lug, and a vertical pin hole perpendicularly extended from said transverse axle hole;

a socket, said socket comprising a cylindrical open chamber at one end, a longitudinal axle hole at an opposite end in communication with said cylindrical open chamber, and a shoulder disposed between said cylindrical open chamber and said longitudinal axle hole;

a temple having a shoulder stopped at one end of said socket, and a coupling rod inserted through the longitudinal axle hole and cylindrical open chamber of said socket into the transverse guide slot of said rim lug and the transverse axle hole of said circular swivel block, said coupling rod having a smoothly curved side notch;

a locating pin mounted in the vertical pin hole of said circular swivel block and forced into engagement with the smoothly curved side notch of the coupling rod of said temple to secure said temple to said circular swivel block;

a compression spring mounted around the coupling rod of said temple within the cylindrical open chamber of said socket and stopped at the shoulder of said socket; and a stepped, tubular stop member mounted around the coupling rod of said temple and stopped between one of the first vertical stop wall and second vertical stop wall of said rim lug and said compression spring outside said socket, said stop member having a front extension section inserted into the cylindrical open chamber of said socket and stopped against said compression spring.

2. The temple mounting structure as claimed in claim 1, wherein said rim lug is integrally formed at the periphery of the rim of the eyeglass frame.

* * * * *